United States Patent [19]

Gaudfrin

[11] Patent Number: 4,659,469
[45] Date of Patent: Apr. 21, 1987

[54] TIGHTNESS DEVICE BETWEEN THE CONVEYOR BELT AND THE COLLECTING BOX WITH ONE OR MORE COMPARTMENTS OF A VACUUM BELT FILTER

[76] Inventor: Guy Gaudfrin, Allée du Bec de Canard, Golf, 78860 Saint Nom La Breteche, France

[21] Appl. No.: 795,925

[22] Filed: Nov. 7, 1985

[30] Foreign Application Priority Data

Nov. 23, 1984 [FR] France .................. 84 17916

[51] Int. Cl.⁴ ............................................. B01D 33/14
[52] U.S. Cl. ...................................... 210/400; 210/783
[58] Field of Search .............. 210/400, 401, 160, 783; 162/363, 364, 348; 209/307

[56] References Cited

U.S. PATENT DOCUMENTS 2,963,161  12/1960  Holland .

FOREIGN PATENT DOCUMENTS 946979   8/1956   Fed. Rep. of Germany .
 47114   1/1937   France .
880582   3/1943   France .
957233   2/1950   France .
642556   9/1950   United Kingdom .
909512  10/1962   United Kingdom .

Primary Examiner—Frank Sever
Attorney, Agent, or Firm—Lewis H. Eslinger

[57] ABSTRACT

Tightness device between the conveyor belt and a fixed vacuum box in a belt filter, wherein said device comprises a single endless friction belt, which is not integral with the conveyor belt but which is driven by it and guided over the vacuum box, said friction belt comprising cavities provided with communication apertures which correspond with an upper opening of the vacuum box, said cavities being wider than the discharge holes provided substantially in the center of the conveyor belt.

12 Claims, 10 Drawing Figures

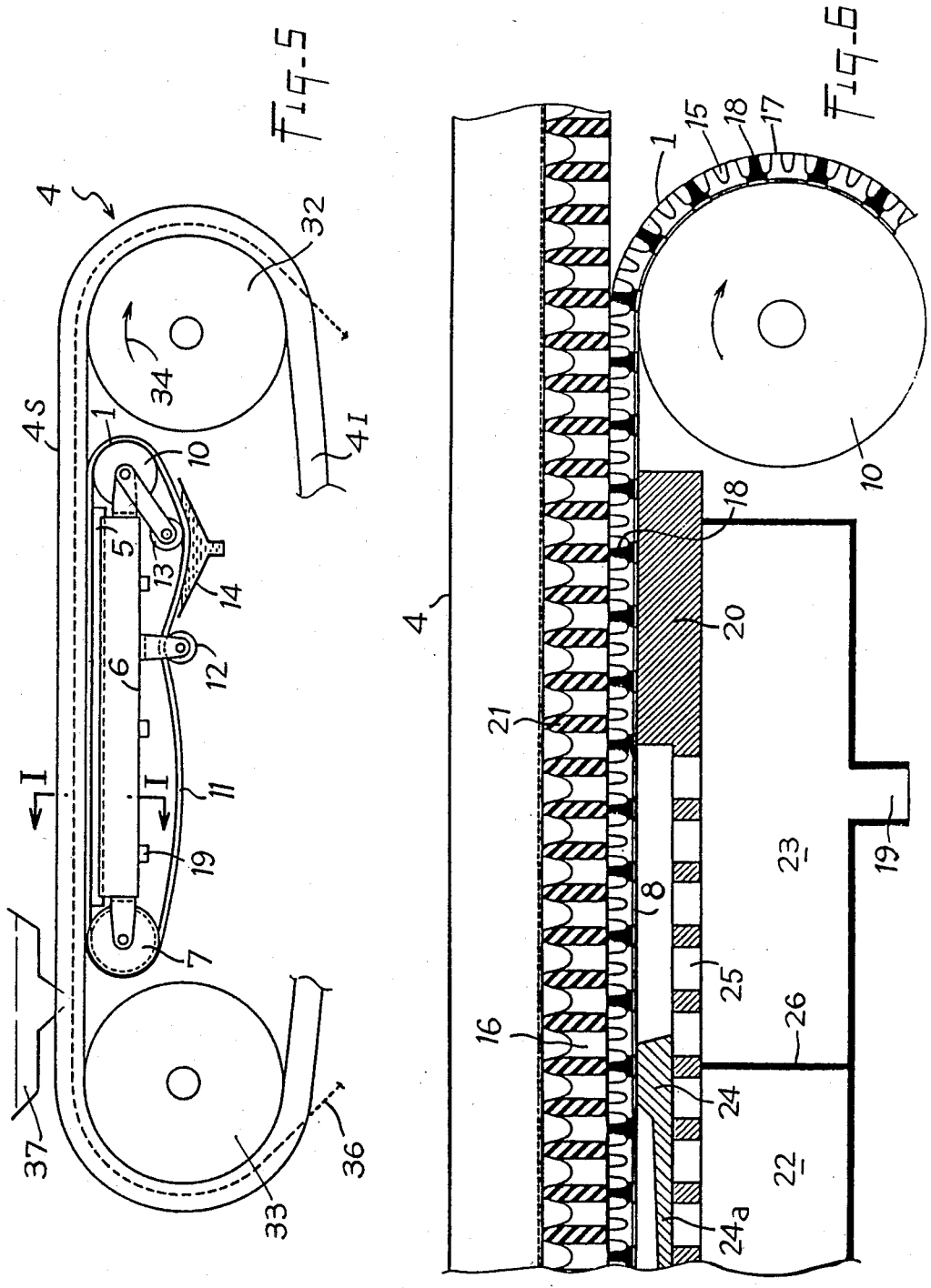

TIGHTNESS DEVICE BETWEEN THE CONVEYOR BELT AND THE COLLECTING BOX WITH ONE OR MORE COMPARTMENTS OF A VACUUM BELT FILTER

The present invention relates to a tightness device situated between the conveyor belt and the collecting box with one or more compartments of a vacuum belt filter.

Vacuum belt filters comprise at least one endless conveyor belt, supported by two drums and driven by at least one of them. This conveyor belt is equipped with transverse channels provided with holes in their center.

On the upper portion of the conveyor belt, the channels are covered with a cloth or other filtering medium through which the filtrates are drawn by suction and over which is formed a filter cake. Said channels are in permanent communication with a collecting vacuum box via the holes provided in their center.

The vacuum applies the conveyor belt over the fixed collecting box, thus ensuring tightness but creating friction between the contacting surfaces.

It has always been the aim to reduce that friction, hence the wearing and driving power of the belt, by using materials with a low coefficient of friction, lubricating the contacting surfaces, and reducing as much as possible the opening of the vacuum box.

In some of the already known filters, the conveyor belts are equipped with bands known as wear or slip bands which are called hereinafter "friction belts", forming part of the conveyor belt or adhesively fixed thereto. When the friction belt is fixed by adhesive means, there can be either two of them, one on each side of the channel holes, or only one which is perforated in the same way as the conveyor belt.

Other known filters use two parallel friction belts which are not integral with the conveyor belt but which are driven and guided by the wear or slip pieces fixed on both sides of the opening of the vacuum box.

In yet other types of filters, the vacuum boxes are equipped with rigid wear or slip pieces in PTFE or in high density polyethylene or any other wear-resistant material. Said rigid wear or slip pieces are fixed on either side of the box opening.

One disadvantage of all the aforesaid systems resides in the fact that, constructionally speaking, it is difficult to obtain that the holes of the conveyor belt and the opening of the box coincide perfectly, and therefore it can happen that the holes are more or less obturated by the box slip pieces.

The same drawback may also be due to the lateral displacement of the conveyor belt.

One way of obtaining that the holes in the conveyor belt always open into the opening of the box, is to design the box with a large enough opening to allow for the belt construction tolerances and for its difficult-to-control wide or small lateral displacement.

Yet, any increase of the box opening entails an increase in the pressure due to the vacuum, hence an increase of the friction forces.

Another disadvantage resides in the fact that, if the friction belts are integral with the conveyor belt or adhesively fixed thereto, it is difficult to replace them when they are worn.

There is also a disadvantage in the tightness system constituted by two friction belts which are not integral with the conveyor belt, but driven by said belt. Although they are easily replaced when worn, they have on the other hand to be guided by the wear or slip parts of the box in order not to be sucked in by the vacuum. The wear or slip pieces of the box have a cross-section with a stop member for holding back the belt sucked in by the vacuum. Said stop member is thinner than the friction belt so as not to rub against the conveyor belt. But when the wear or slip pieces of the box are very worn, said stop can come into contact with the conveyor belt and damage it.

Another disadvantage of tightness devices with two friction belts, integral with the conveyor belt or not, resides in the impossibility of obtaining perfect tightness at the ends of the vacuum box.

The extent of the difficulties encountered with currently used belt filters is obvious from the foregoing, even more so when considering the size which some of those filters can reach, where the belt can reach up to 4 meters in width and thirty meters in length. There is at present no real way of ensuring that conveyor belts of such sizes are perfectly straight, and/or that their discharge holes are perfectly aligned both from construction and after months of continuous operation.

It is now the object of the present invention to propose a tightness system between the conveyor belt and the collecting box which tends to eliminate all the aforesaid drawbacks.

To this end, the invention proposes a tightness system between the conveyor belt and the fixed vacuum box of a belt filter, which is characterized in that it comprises a single endless friction belt, which is not integral with the conveyor belt but which is driven by it and guided over the vacuum box, said friction belt comprising cavities provided with communication apertures which correspond with an upper opening of the vacuum box, said cavities being wider than the discharge holes provided substantially in the center of the conveyor belt.

The invention will be more readily understood on reading the following description with reference to the accompanying drawings in which:

FIG. 5 is an overall side view of the device.

FIG. 6 is a partial longitudinal section of the device.

Figure 1:
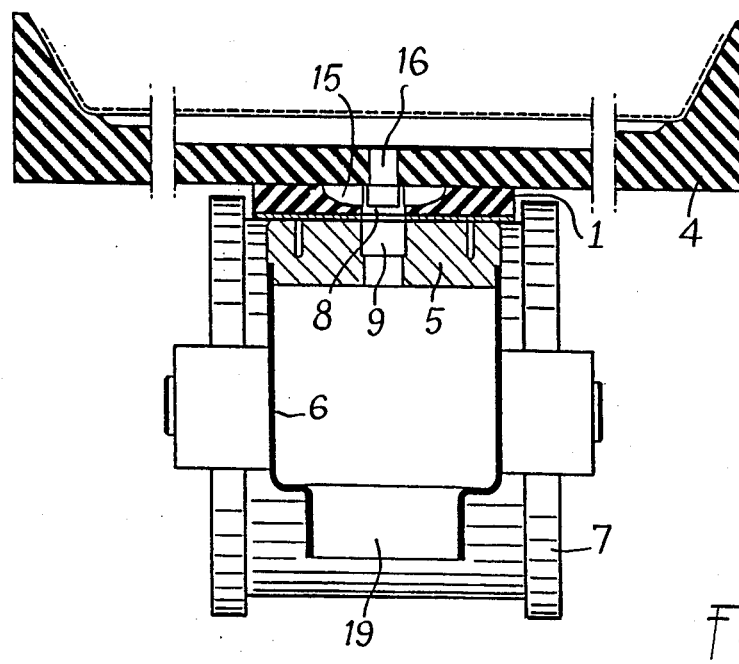
FIG. 1 is a cross-sectional view of the device according to the invention taken along line I—I of FIG. 5.

In the overall side view of FIG. 5 the belt filter comprises an endless conveyor belt 4, wound over two drums 32, 33 of horizontal axis, one of which drums (32)

is driven by a motor (not shown) in the direction of arrow 34. The conveyor belt thus has an upper portion 4S along which the filtering is effected, and a lower portion 4I, on the path of which are interposed additional devices, such as tensioning devices, not shown in the figure.

As illustrated in FIGS. 1, 3, 8 and 9, the cross-section of the conveyor belt is U-shaped, its horizontal base comprising transverse channels 15 and discharge holes 16 perpendicular to and at the center of each channel.

A cloth 36 or other similar filtering medium is wound over the upper portion of belt 4S, said cloth covering the transverse channels, and a distributor 37 pours over the conveyor belt the preparation or slurry to be filtered.

Over part of the horizontal path of the upper belt portion, the conveyor belt slides along the upper face of a collecting vacuum box 6. Said collecting box is provided with a longitudinal opening 9 which is made in a sliding plate 5 and the conveyor belt slides along said plate via a tightness device to be described hereinafter.

The tightness device provided between the conveyor belt and the vacuum box consists in using a single friction belt, which is not integral with the conveyor belt but which is driven by the latter, said device being so designed as to allow the transverse displacement of the conveyor belt with respect to the box without closing the passage between the discharge holes of the channels of the conveyor belt and the longitudinal opening of the vacuum box. Said device further allows a reduction of the width of the opening of the vacuum box, hence a reduction of the friction forces created by the vacuum.

Figure 7:
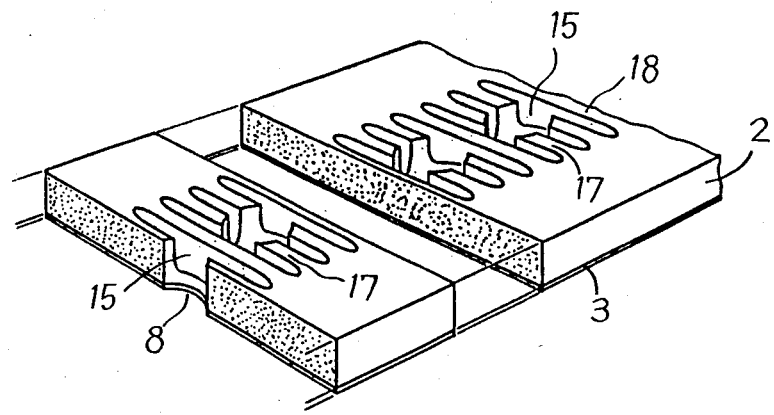
FIG. 7 is a perspective view of one piece of the friction belt forming part of the device.

As illustrated in cross-section in FIG. 7, the endless friction belt 1 is composed of at least two materials, bonded together, one of which (2) constitutes the face in contact with the conveyor belt 4 and the other (3) constitutes the face sliding over the sliding plate 5 of the box 6. The material in contact with the conveyor belt is chosen to have good grip properties whereas the material in contact with the box is chosen to have a good slip coefficient and a good resistance to wear. Both materials are sufficiently flexible to allow the winding of the friction belt.

As illustrated in FIGS. 1, 2, 3, 4 and 5, a grooved pulley 7 situated at the entrance to the box 6 maintains the friction belt 1 in coincidence with the sliding plate 5 of the box 6 when both are contacting. The apertures 8 in the friction belt are thus exactly superposed on the opening 9 of the box. Said box 6, which is perfectly straight, being placed exactly along the moving direction of the conveyor belt 4 which drives the friction belt 1 in its displacement, the superposition of apertures 8 and opening 9 being maintained throughout the displacement.

When the friction belt 1 leaves the conveyor belt 4 at the end of box 6, it comes into contact with another pulley 10 which limits the acceptable radius of curvature, in the same way as the entering grooved pulley 7.

The entering grooved pulley 7 and the exit pulley 10 fixedly mounted on the box 6 rotate with the friction belt but could also be replaced by fixed guide blocks which would have the same cross-section and on which the friction belt could slip.

Optionally, the return portion 11 of the friction belt 1 may be supported by runners 12 when the distance to be covered is long. It can also be kept tensioned by a tensioning roller 13.

Another feature of the device according to the invention consists in causing the return portion of the friction belt to pass through a trough 4 filled with water or with a regenerating liquid, to keep it clean.

As illustrated in FIGS. 6 and 7, the material 2 of the friction belt 1 in contact with the conveyor belt 4 is thick enough to contain cavities 15 perforated in their center with communication apertures 8 traversing also the material.

Figure 3:
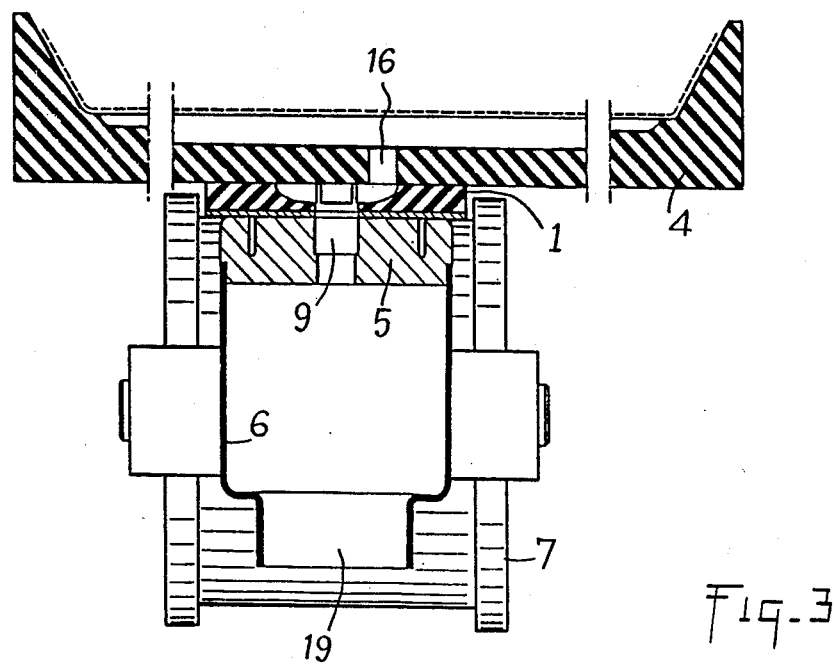
FIG. 3 is a similar cross-sectional view of the device to that shown in FIG. 1, except that the conveyor belt is offset with respect to the vacuum box.

Said cavities 15 create a hollow space between the conveyor belt and the vacuum box 6, which is wider than the holes 16 provided in the conveyor belt 4. As illustrated in FIG. 3, if the holes 16 of the conveyor belt are not exactly centered, or if the conveyor belt 4 moves laterally, the holes 16 remain in communication with the opening 9 of the box 6 via the said cavities 15 and communication aperture 8 of the friction belt 1 which is permanently guided on the box 6.

It is thus possible to make the opening 9 of the box 6 relatively narrow without any risk of closing the holes 16 of the conveyor belt as would happen with the conventional systems where the width of the opening 9 of the box has to be greater in order to allow for the lateral displacements of the conveyor belt or for any inaccurate centering of the holes 16 with respect to the coneyor belt.

As illustrated in FIGS. 1, 3 and 6, the apertures 8 in the friction belt 1 and the holes 16 in the conveyor belt have diameters which hardly differ at all. As will be seen hereinafter the drilling pitches being different, the diameters will be selected so that the friction belt does not slow down the flow of the fluids extracted from the conveyor belt. The width of the opening 9 of the box 6, which may be as small as possible, does not exceed the diameter of the apertures 8 of the friction belt.

Figure 10:
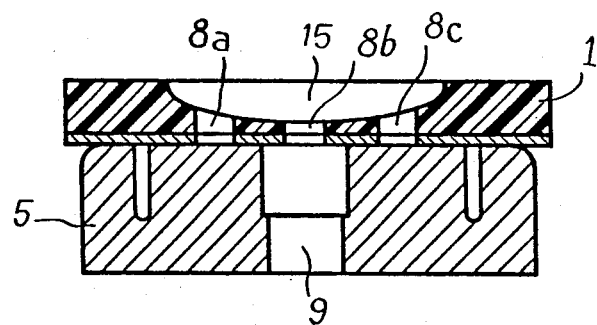
FIG. 10 is a detailed view of a variant of the invention.

According to the variant illustrated in FIG. 10, the friction belt 1 comprises several communication apertures 8a, 8b, 8c for every cavity 15 distributed through the width of said cavity. This particular arrangement guarantees a constant communication with the opening 9 of the vacuum box even if the friction belt moves laterally, and this without increasing the applying force created by the vacuum and applying the friction belt 1 on the sliding plate 5.

Such lateral displacement could indeed occur in filters of very large size with very long conveyor belts. It could happen then that the direction followed by the conveyor belt varies slightly with respect to the fixed box, and the friction belt, adhering to the conveyor belt, would then risk not to be exactly superposed on the box throughout its path.

As particularly illustrated in FIG. 7, another feature of the device consists in separating the cavities 15 in the friction belt 1 by at least partial transverse ribs 17 and 18, acting as intermediate support between the conveyor belt 4 and the sliding plate 5 of the box 6 inside which a vacuum is created through orifices 19 shown in FIGS. 1, 3 and 5.

Figure 8:
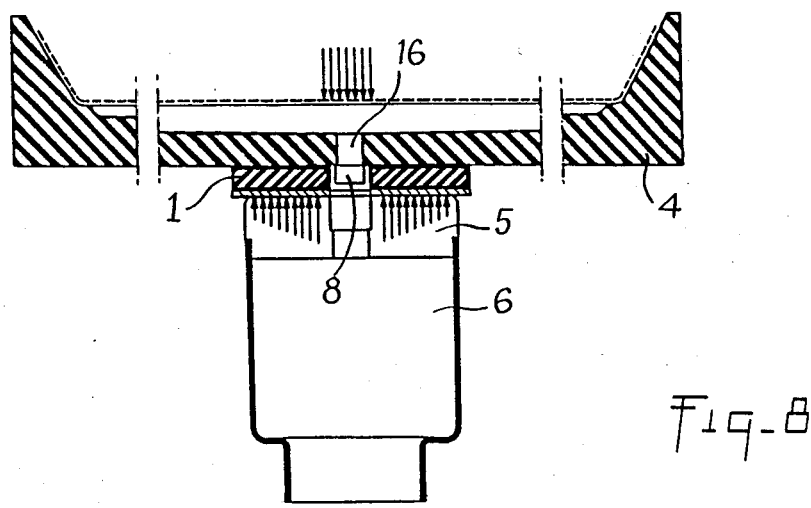
FIG. 8 is a simplified cross-section of the device taken along line I—I of FIG. 5, showing the action and reaction due to the vacuum when ribs are provided in the cavities of the friction belt.

Without these ribs 17 and 18 and because of the lack of rigidity of the flexible friction belt 1, the conveyor belt could only really rest against the plate 5 on either side of the cavity 15 via the solid part of the friction belt 1, and in effect, it would support a load created by the vacuum through the entire width of the cavity 15 as illustrated in FIG. 8.

Figure 9:
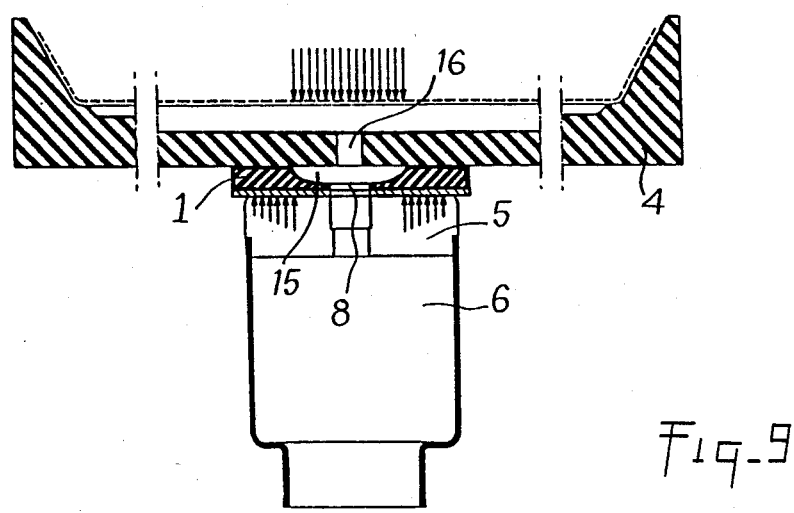
FIG. 9 is a simplified cross-section of the device along line I—I of FIG. 5 showing the action and reaction due to the vacuum without the ribs in the cavities of the friction belt.

Owing to these ribs 17 and 18, the conveyor belt 4 is applied directly over the entire width of the faces of the sliding plate 5 of the box 6 and supports a load due to the vacuum only over the width of the opening 9 of the box 6, as illustrated in FIG. 9.

Another advantage of the presence of transverse ribs 17 and 18 resides in the fact that the friction belt 1 reinforces the conveyor belt 4 in its center where it is sucked in through the opening 9 of the vacuum box 6, and in that part where it is weakened by the holes 16.

Figure 2:
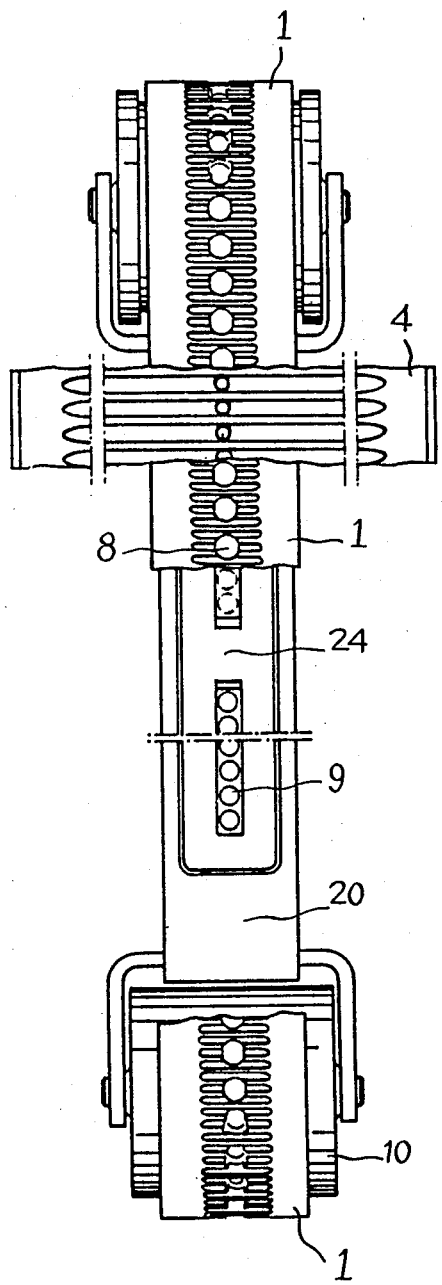
FIG. 2 is a top view of the device shown in FIG. 1, showing part of each of the superposed elements.
Figure 4:
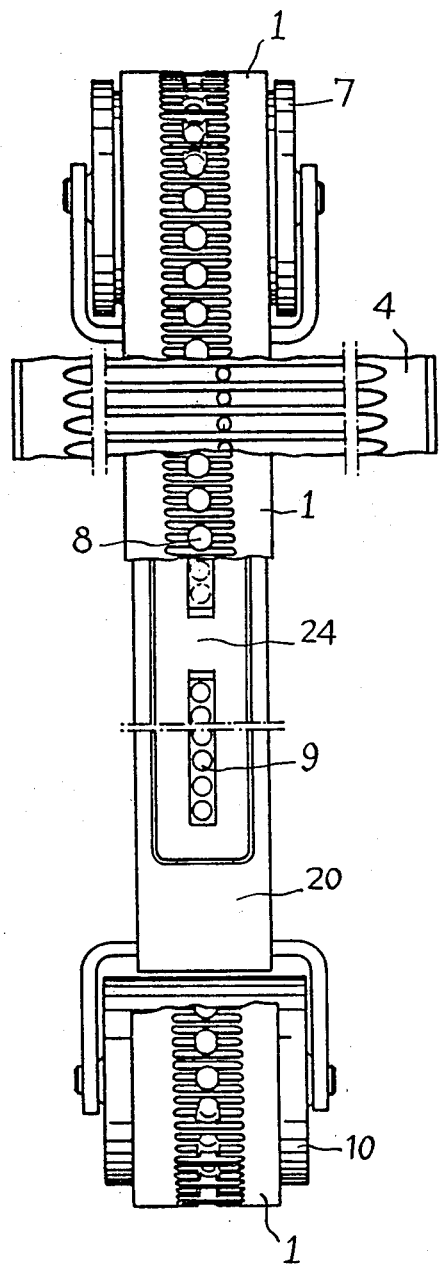
FIG. 4 is a top view of the device shown in FIG. 4, showing part of the superposed elements, in which the conveyor belt is offset with respect to the vacuum box.

It will be noted in FIGS. 2 and 4 and in particular in FIG. 7 that the ribs are not all interrupted by the apertures 8 of the friction belt 1. There is between the apertures 8 at least one rib 18 which remains uninterrupted throughout the width. Said ribs 18 prevent any intake of air at the ends of the box by closing the passage created by the cavities 15 when the friction belt 1 leaves the conveyor belt 4.

As can be seen in FIG. 6, the pitch of the ribs 18, which is equal to the drilling pitch of the apertures 8 of the friction belt 1, is different from that of the holes 16 of the conveyor belt 4 so that tightness between the conveyor belt and the solid ends 20 of the box is always achieved at least by one rib 18 contacting with a solid part 21 of said conveyor belt 4.

Likewise, the ends of the sliding plate 5, limiting the opening 9 of the box 6 comprise solid zones 20 which are sufficiently long so that there is, whatever the conditions, at least one rib 18 which is in contact by its top part with a solid portion 21 of the conveyor belt between two of its consecutive discharge holes 16, as well as in contact by its base with the solid zones 20 of the sliding plate.

To sum up, for a given conveyor belt, the pitch of the apertures in the friction belt and the length of the solid zones in the sliding plate are so selected that tightness is always achieved at the end of the vacuum box, regardless of the position of the friction belt with respect to the conveyor belt.

As illustrated in FIG. 6, the same applies to achieve tightness between two compartments 22 and 23 of the vacuum box when it is desired to create different vacuums therein. In this case, the sliding plate 5 is provided with partitions 24 of which the length contacting with the friction belt 1 is also sufficiently long, for the reasons indicated above.

Another special feature of said partitions resides in the possibility of moving them in the plate 5 in order to modify the length of openings 9 as required. To this effect, opening 9 of plate 5 is constituted by a groove issuing into box 6 via orifices 25 provided in the bottom. Partition 24, of same cross-section as the groove is provided with an elongated base 24a less high than the groove and closing off the holes 25.

Partition 24 thus permits the modification of the respective lengths of the opening sections communicating with each compartment.

Accordingly, when the openings 9 are modified by moving the partition 24, the filtrates collected through the openings are always respectively directed towards compartments 22 and 23 without it being necessary to alter the position of the fixed partition 26 separating compartments 22 and 23.

Advantageously, the sliding plate will be produced in one piece and provided with a longitudinal aperture in its center, this for ready assembly and adjustment on the top of the vacuum box.

The tightness device between the conveyor belt and vacuum box described hereinabove presents the following advantages:

(1) It permits the lateral displacement of the conveyor belt with respect to the box without obstructing the discharge holes in the channels of the conveyor belt.

(2) It permits a reduction of the opening width of the vacuum box, hence a reduction of the friction forces which are caused by the vacuum.

(3) Reduction of the friction forces is accompanied by a reduction of the power needed for driving the conveyor belt and by a reduction of the wear of the contacting parts.

(4) The use of a single friction belt, which is not integral with the conveyor belt, eliminates the disadvantages inherent in devices comprising two separate friction belts.

(5) The use of a single friction belt according to the invention reinforces the conveyor belt in its center where it is sucked in by the vacuum and where it is weakened by the channels discharge holes.

(6) Due to the design of the device according to the invention it is also possible to ensure tightness between two separate compartments of the vacuum box and thus to create different vacuums therein.

(7) The design of the device and in particular of the sliding plate of the vacuum box makes it possible to alter the length of the opening sections communicating with their respective compartments, without changing the position of the partitions separating the compartments.

(8) The device according to the invention is readily adaptable to any existing installation without involving major alterations nor lenghty interruptions in its operation.

(9) When the friction belt has worn down and replacement is called for, the installation is only immobilized for a very short time (about one hour for an installation of the size mentioned at the beginning).

(10) the device according to the invention makes it possible to design belt filters of a size really greater than the currently used sizes (length equal to or greater than 50 meters).

What is claimed is:

1. In an endless belt filter system comprising an endless conveyor belt wound over two drums having respective horizontal axes in spaced-apart relationship, with one of said drums being rotatably driven, said belt having a substantially U-shaped cross-section and being formed with transverse channels across a substantially horizontal base of said U-shaped cross-section and with discharge holes arranged perpendicularly to said base and being located substantially at the center of each of said channels, a fixed collecting vacuum box having a longitudinal upper opening and being located below an upper portion of said conveyor belt and extending over part of the length of said upper portion, and a tightness device interposed between said conveyor belt and said fixed vacuum box, the improvement wherein said tightness device comprises:

a single endless friction belt, separate from the conveyor belt and interposed between the conveyor belt and the vacuum box, said friction belt having an upper face in contact with a surface of the conveyor belt so as to be driven by the conveyor belt and a lower face for sliding over said vacuum box;

a guide means for maintaining said friction belt in substantial alignment with said vacuum box; and said endless friction belt being provided with cavities and associated apertures in the lower face of said cavities in registry with the upper opening of the vacuum box, said cavities at the upper face of the friction belt having a transverse length relative to the width of said endless friction belt greater than a width of said discharge holes in the conveyor belt.

2. Device as claimed in claim 1, wherein said friction belt is produced from at least two different materials, one having a high friction coefficient with respect to that of the conveyor belt, and the other having a low friction coefficient and low wearing rate with respect to the vacuum box.

3. Device as claimed in claim 1, wherein said single friction belt is guided by pulleys fixedly mounted on the box, said pulleys keeping said belt moving along the axis of said box.

4. Device as claimed in claim 1, wherein the cavities in said friction belt are provided with at least partial ribs forming a support for the conveyor belt at the level of said cavities.

5. Device as claimed in claim 1, wherein said cavities are separated by uninterrupted ribs through the entire width of the friction belt.

6. Device as claimed in claim 1, wherein the vacuum box is equipped with a sliding plate in one piece, in the center of which is provided a longitudinal opening.

7. Device as claimed in claim 6, wherein the opening of the sliding plate consists in a longitudinal groove of which the bottom comprises orifices in communication with the vacuum box.

8. Device as claimed in claim 7, wherein movable partitions are provided, which partitions are received in said groove and divide said opening into sections of adjustable length.

9. Device as claimed in claim 8, wherein said vacuum box is divided into compartments by fixed partitions and said movable partitions comprise an elongated base permitting the modification of the respective lengths of the opening sections communicating with each compartment.

10. Device as claimed in claim 6, wherein the pitch of the apertures of the friction belt differs from that of the discharge holes of the conveyor belt, and the sliding plate comprises at its ends solid zones of length such that there is always a complete rib of the friction belt contacting both with said solid zone and the conveyor belt between two of its consecutive discharge holes.

11. Device as claimed in claim 10, wherein movable partitions are provided, which partitions are received in said groove and divide said opening into sections of adjustable length, and ribs are provided, which ribs separate cavities of the friction belt, wherein the length of each movable partition is such that there is always a complete rib of the friction belt contacting both with said movable partition and with the conveyor belt between two of its consecutive discharge holes.

12. Device as claimed in claim 1, wherein each cavity comprises a plurality of communication apertures distributed throughout the width of said cavity.

* * * * *